Patented June 3, 1952

2,598,666

UNITED STATES PATENT OFFICE 2,598,666

WAX COMPOSITION

Louis M. Sesso and Anna Mae Jordan, Racine, Wis., assignors to S. C. Johnson & Son, Inc., Racine, Wis.

No Drawing. Application June 30, 1948, Serial No. 36,287

10 Claims. (Cl. 106—10)

This invention relates to an aqueous wax composition and method of preparation. More particularly, it relates to a novel aqueous wax dispersion particularly adopted for coating relatively smooth surfaces by being sprayed thereon.

The spraying of a wax coating composition upon diverse surfaces has heretofore been recognized as an expedient manner of application. Attempts have been made to formulate an aqueous wax composition suitable for spraying, but difficulty has been experienced in producing a hard, glossy, protective film upon the surface, yet one that is relatively easy to buff.

A liquid wax composition has been proposed for application by spraying which includes a major portion of an inflammable solvent as the vehicle carrier. However, this composition provides a continuous fire hazard, not only while stored in garages, filling stations and the like, but is especially hazardous when dispersed into minute particles during spraying.

Now, in accordance with our invention, we have discovered an aqueous wax composition which comprises from 3 to 14% by weight of a wax selected from the group consisting of ouricury, carnauba, beeswax, paraffin and mixtures thereof, together with from 3 to 30% of a material selected from the group consisting of lower aliphatic alcohols having from 1 to 4 carbon atoms, acetone, dioxane, ethylene glycol monoethyl ether, ethylene glycol monomethyl ether, ethylene glycol diethyl ether and mixtures thereof, and emulsifying agent, and water. Water comprises the major portion by weight of the composition. This novel composition when applied, produces a highly protective film, yet a film plastic enough so that it can be dusted to a high gloss with a minimum of effort. Ordinarily, within 15 to 30 seconds after application, the wax film is dry and ready to be buffed.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

Example 1

An aqueous wax composition was prepared by melting 22.5 parts of yellow carnauba and 22.5 parts of beeswax in a suitable vessel by heating to a temperature of about 185° F. Thirty parts of ethylene glycol monomethyl ether was then added to this mixture. In another vessel 373 parts of water and 5 parts of glycerin were heated to a temperature of about 182° F. One part of diethylamine and 1 part of morpholine were then added to the second vessel. After thorough mixing, the wax and ethylene glycol monomethyl ether in the first vessel were added to the constituents in the second vessel. The mixture was agitated and 45 parts of t-butanol added while continuing the agitation. The resulting composition was a stable aqueous dispersion which, when applied to a relatively smooth surface by means of an air gun transmitting 40 to 60 lbs. pressure, dried in 15 to 30 seconds. The surface area covered was indicated by the appearance of gray-white dried wax particles which were easily buffed to produce a glossy lustre.

Example 2

An aqueous wax composition was prepared by melting 30 parts of yellow carnauba, 12 parts of beeswax and 18 parts of paraffin by heating to about 185° F. Sixty parts of dioxane was then added to the mixture. In another vessel 309 parts of water and 5 parts of polyoxyalkylene sorbitan monolaureate were heated to a temperature of about 182° F. Six parts of morpholine was then added to this second vessel. The mixture was stirred and about 60 parts of cold isopropanol added while simultaneously agitating the mixture. The resulting composition was later mixed with 500 additional parts of water at room temperature. The resulting composition was applied to a surface as in Example 1 and the result was substantially the same.

Example 3

An aqueous wax composition was prepared by melting 40 parts of yellow carnauba in a suitable vessel by heating to about 185° F. Twenty-eight and five-tenths parts of dioxane was then added to this mixture. In another vessel 359.7 parts of water and 4.8 parts of glycerin were heated to a temperature of 182° F. To this mixture in the second vessel 1.0 part of morpholine and 1.0 part of diethylamine were then added. After thorough mixing, the wax and dioxane in the first vessel were added to the constituents in the second vessel. The mixture was stirred and 65 parts of n-butanol added. The resulting composition was applied to a relatively smooth surface by means of a manual air spray gun, transmitting about 10 lbs. of pressure. The surface area covered was indicated by the appearance of gray-white dried wax particles which were easily buffed to produce a glossy lustre.

Example 4

Example 1 was repeated in detail execpt that ouricury wax was substituted for a portion of the carnauba wax employed in Example 1 so that the proportion of carnauba wax was reduced to 15 parts, the quantity of ouricury wax being 7.5 parts. The results were substantially the same as those found in Example 1.

Example 5

Twenty-two and five-tenths parts of yellow carnauba and 22.5 parts of beeswax were melted in a suitable vessel by heating to about 185° F. In another vessel 353 parts of water was heated to a temperature of about 182° F. Two parts of morpholine were then added to the second vessel. The wax in the first vessel was added to and simultaneously mixed with the ingredients in the second vessel. This mixture was cooled to about 150° F. and 100 parts of methanol added. The resulting composition was applied to a relatively smooth surface and upon wiping, produced an attractive protective gloss.

Example 6

Twenty parts of beeswax and 20 parts of yellow carnauba were melted in a suitable vessel by heating to a temperature of about 185° F. To this mixture 35 parts of isopropanol was then added. In another vessel 417 parts of water and 5 parts of glycerin were heated to a temperature of about 182° F. One and five-tenths parts of diethylamine and 1.5 parts of morpholine were then added to the second vessel. After thorough mixing, the wax and isopropanol in the first vessel were added to and mixed with the constituents in the second vessel. The resulting composition was applied as in Example 1. The wax film dried in 15 to 30 seconds, was buffed and rendered a glossy protective finish.

Example 7

Example 6 was repeated. However, iso-butanol was substituted for the isopropanol and the ingredients and proportions thereof varied thus:

| | Parts |
|---|---|
| Yellow carnauba | 22.5 |
| Beeswax | 22.5 |
| Iso-butanol | 50 |
| Water | 398 |
| Glycerin | 5 |
| Mineral sulphonate | 2 |
| | 500 |

The composition was applied to a relatively smooth surface by means of air gun transmitting 40 to 60 lbs. of pressure, and the results attained were substantially the same as in Example 1.

Example 8

Example 6 was repeated. However, methyl cellosolve was substituted for the isopropanol and the ingredients and proportions thereof varied thus:

| | Parts |
|---|---|
| Yellow carnauba | 30 |
| Beeswax | 30 |
| Ethylene glycol monomethyl ether | 60 |
| Water | 373 |
| Glycerin | 5 |
| Morpholine | 1.5 |
| Diethylamine | .5 |
| | 500 |

The resulting composition was applied to a relatively smooth surface and upon buffing produced a water-resistant glossy finish.

Example 9

Example 6 was repeated. However, dioxane was substituted for isopropanol and the ingredients and proportions thereof varied thus:

| | Parts |
|---|---|
| Carnauba | 30 |
| Paraffin | 15 |
| Dioxane | 150 |
| Water | 298 |
| Glycerin | 5 |
| Morpholine | 1.5 |
| Diethylamine | .5 |
| | 500 |

The resulting composition was applied as that in Example 1 and the results obtained were substantially the same.

Example 10

Twenty-one parts of carnauba and 25 parts of beeswax were melted in a suitable vessel. To this mixture 15 parts of n-propanol, 1.5 parts of diethylamine and 1.5 parts of morpholine were then added. In another vessel 431 parts of water and 5 parts of glycerin were heated to a temperature of about 182° F. After thorough mixing the wax and n-propanol in the first vessel were added and simultaneously mixed with the ingredients in the second vessel. A protective glossy finish resulted when the resulting composition was applied and buffed on a relatively smooth surface. A drying time of about one minute was allowed before buffing was commenced.

The use of carnauba, beeswax and paraffin were shown in the examples as constituting the wax base and it should be realized that these waxes may be used alone or in combination. The term "paraffin" includes all types of paraffin waxes. Care should be observed, however, when using beeswax or paraffin as the major portion of the wax base, that a surface area indicator, such as boron, also be incorporated. These waxes of themselves do not have the ability to render sufficient indication of area coverage when incorporated in an aqueous emulsion and applied to a surface.

The total wax content may be varied within a range of 3 to 14% by weight of the emulsions depending upon the type of surface to be covered, predetermined stability requirements of the product, and the method of application. The wax content should be such that it provides a sufficient amount of acid content without the auxiliary addition of fatty acids. If less than 3% of wax by weight is used, the stability of the dispersion is greatly decreased and unsatisfactory results are obtained since sufficient coverage cannot be had. If more than 14% of wax is used, and excessive overlapping of film deposits occur, and the waxed surface area is very difficult to buff.

The following solvents, either alone or in combination in amounts of 3 to 30% by weight of the composition, are essential ingredients in the wax composition: lower aliphatic alcohols having from 1 to 4 carbon atoms including isopropanol, methanol, ethanol, propanol, t-butanol, n-butanol, sec-butanol, and iso-butanol; acetone; dioxane; ethylene glycol monomethyl ether; ethylene glycol monoethyl ether; ethylene glycol diethyl ether. The use of one of the above-listed solvents in a proportion less than 3% results in too small a wax particle size, fusion of the particles on the treated surface, and very difficult buffing. Over 30% renders too large a wax particle size for a uniform film and is incapable of rendering a satisfactory gloss. As illustrated in Examples 1 to 4 the solvents may be employed in combination or a single solvent may be used as disclosed in Examples 5 to 10.

Morpholine, mineral sulphonate and diethylamine have been shown in the examples as ingredients, which upon reacting with the free fatty acids present in the waxes employed, become the emulsifying agents. However, it will be appreciated by those skilled in the art, that any of a wide variety of such agents can be satisfactorily employed. Ammonia or any amine, when in combination with the fatty acids present in the wax or an added auxiliary fatty acid such as oleic, palmetic, stearic, etc., is operable as an emulsifying agent. Potash or soda soaps of any of the common fats are expedient. Also operable are anionic agents such as sodium lauryl sulphate dioctyl ester of sodium sulphosuccinic acid, non-ionic emulsifying agents such as glycerol esters of higher fatty acids and ethylene oxide condensates of long chain fatty acids and alcohols, polyoxyethylene derivatives of fatty esters such as sorbitan monolaureate. Other well known agents such as sulphonated vegetable oils may also be used.

While it is evident from the above that a wide variety of emulsifying agents can be used, the volatile amines, however, are preferred because of their availability, price, and the rapid rate in which they volatilize when the wax film has been applied. Diethylamine and like amine-soap dispersions produce small particle wax size, excellent stability, good gloss, but hard buffing. Morpholine and like amine-soap dispersions produce large wax particle sizes in the film and make for easy buffing. A combination of morpholine and diethylamine types of amine are desirable. Where methanol, ethanol or acetone is employed alone as the solvent (Example 5) or used as the substantial proportion of a solvent combination, it is suggested that morpholine, or similar amine be used as the sole emulsifying agent. Methanol, ethanol and acetone produce a wax composition of very small particle size. Since it is desirable to attain a compromise of small and large wax particles, the use of morpholine will compensate by creating wax particles of larger size. Likewise, as in Example 8 where methyl cellosolve is employed alone as the solvent and as in Example 9 using only dioxane, it is advisable to employ an emulsifying agent, which renders a large wax particle size, such as morpholine, in greater proportion than an emulsifying agent which creates small wax particle size, such as diethylamine. The emulsifying agents may be mixed with the water and later with the wax or, as shown in Example 10, they may be mixed directly with the wax and solvent.

Water is employed as the vehicle of this wax-in-water dispersion and must constitute the major portion by weight thereof since the critical maximum proportion of the solvent is 30%.

It should be understood that although aqueous wax compositions heretofore described are particularly adapted to be applied to a surface by spraying, their intended use is not so limited. Similar success may be had by dipping the article to be waxed in the composition, applying the coating with a cloth, pad, etc.

As shown in the examples, the wax composition of my invention can be so produced so as to be ready for use and when applied imparts a hard, yet easy to buff, water-resistant gloss to the treated surface. Yet, as shown in Example 2, the emulsion may be later diluted by the user with an equal portion of water at room temperature and applied to a surface with a resulting finish comparable to that of the ready-to-use emulsion of Example 1.

If desired, glycerin and polyoxyalkylene sorbitan monolaureate may be incorporated as ingredients to act as plasticizers so as to increase gloss and film continuity with a minimum amount of buffing. These materials act as binders for the wax particles in the film so that upon wiping or buffing with a cloth, the wax dust fuses, not having as great a tendency to leave the waxed surface as loose or unbound dust. These plasticizers, however, as shown in Example 5, are not essential ingredients.

A period of 15 to 30 seconds has been shown as the typical time period allowed to permit the film to dry upon the treated surface. However, it should be noted that such period is extended to approximately one minute where the minimum amount of solvent advocated is employed as in Example 10.

Thus, in accordance with our invention, a stable wax composition has been prepared which is particularly suitable for use in imparting a durable, protective, yet glossy finish to relatively smooth surfaces.

Other modes of applying the principle of the invention may be employed instead of those explained, change being made as regards the method and/or the composition herein disclosed, provided the step or steps stated or the composition described in any of the following claims or the equivalent of such stated step or steps or compositions be employed.

We claim:

1. An aqueous wax composition consisting essentially of from 3 to 14% by weight of a wax selected from the group consisting of ouricury, carnauba, beeswax, paraffin and mixtures thereof, from 3 to 30% of a material selected from the group consisting of monohydroxy aliphatic alcohols having from 1 to 4 carbon atoms, acetone, dioxane, ethylene glycol monoethyl ether, ethylene glycol monomethyl ether, ethylene glycol diethyl ether and mixtures thereof, an emulsifying agent and the major portion by weight of water.

2. An aqueous wax composition consisting essentially of from 3 to 14% by weight of a wax selected from the group consisting of ouricury, carnauba, beeswax, paraffin and mixtures thereof, from 3 to 30% of a material selected from the group consisting of monohydroxy aliphatic alcohols having from 1 to 4 carbon atoms, acetone, dioxane, ethylene glycol monoethyl ether, ethylene glycol monomethyl ether, ethylene glycol diethyl ether and mixtures thereof, an emulsifying agent and the major portion by weight of water and about 1% by weight of glycerin.

3. An aqueous wax composition consisting essentially of from 3 to 14% by weight of a wax selected from the group consisting of ouricury, carnauba, beeswax, paraffin and mixtures thereof, from 3 to 30% of a material selected from the group consisting of monohydroxy aliphatic alcohols having from 1 to 4 carbon atoms, acetone, dioxane, ethylene glycol monoethyl ether, ethylene glycol monomethyl ether, ethylene glycol diethyl ether and mixtures thereof, an emulsifying agent and the major portion by weight of water and about 1% by weight of polyoxyalkylene sorbitan monolaureate.

4. An aqueous wax composition consisting essentially of from 3 to 14% by weight of a wax selected from the group consisting of ouricury, carnauba, beeswax, paraffin and mixtures thereof, from 3 to 30% isopropanol, an emulsifying agent and the major portion by weight of water.

5. An aqueous wax composition consisting essentially of from 3 to 14% by weight of a wax selected from the group consisting of ouricury, carnauba, beeswax, paraffin and mixtures thereof, from 3 to 30% of isopropanol and dioxane, an emulsifying agent and the major portion by weight of water.

6. An aqueous wax composition consisting essentially of from 3 to 14% by weight of a wax selected from the group consisting of ouricury, carnauba, beeswax, paraffin and mixtures thereof, about 12% isopropanol, about 12% dioxane, an emulsifying agent and the major portion by weight of water and about 1% by weight of polyoxyalkylene sorbitan monolaureate.

7. An aqueous wax composition consisting essentially of from 3 to 14% by weight of a wax selected from the group consisting of ouricury, carnauba, beeswax, paraffin and mixtures thereof, from 3 to 30% of dioxane, an emulsifying agent, the major portion by weight of water and about 1% by weight of polyoxyalkylene sorbitan monolaureate.

8. An aqueous wax composition consisting essentially of from 3 to 14% by weight of a wax selected from the group consisting of ouricury, carnauba, beeswax, paraffin and mixtures thereof, from 3 to 30% of ethylene glycol monomethyl ether, an emulsifying agent and the major portion by weight of water.

9. An aqueous wax composition consisting essentially of from 3 to 14% by weight of a wax selected from the group consisting of ouricury, carnauba, beeswax, paraffin and mixtures thereof, from 3 to 30% of ethylene glycol monomethyl ether and isopropanol, an emulsifying agent and the major portion by weight of water.

10. An aqueous wax composition consisting essentially of from 3 to 14% by weight of a wax selected from the group consisting of ouricury, carnauba, beeswax, paraffin and mixtures thereof, from 3 to 30% of ethylene glycol monomethyl ether and isopropanol, an emulsifying agent and the major portion by weight of water, and about 1% by weight of glycerin.

LOUIS M. SESSO.
ANNA MAE JORDAN.

REFERENCES CITED

The following references are of record in the file of this patent:

UNITED STATES PATENTS

| Number | Name | Date |
|---|---|---|
| 2,048,303 | Swartz | July 21, 1936 |
| 2,244,685 | Fritz | June 10, 1941 |
| 2,349,326 | Wilson | May 23, 1944 |
| 2,374,474 | Dolian | Apr. 24, 1945 |
| 2,456,283 | Jefferson | Dec. 14, 1948 |

OTHER REFERENCES

Chemical Formulary, vol. VI, Bennett, 1943, pages 396, 399 and 400.

Liquid Floor Waxes, discussion by Thomssen et al., parts I and II entitled: Soap, June 1941, pages 115, 117, 119, 121, 146; Soap, June 1941, pages 100–104.